May 11, 1965     W. A. KELLER ETAL     3,183,408

INSTRUMENT MOUNTING ASSEMBLY

Filed April 12, 1960     4 Sheets-Sheet 1

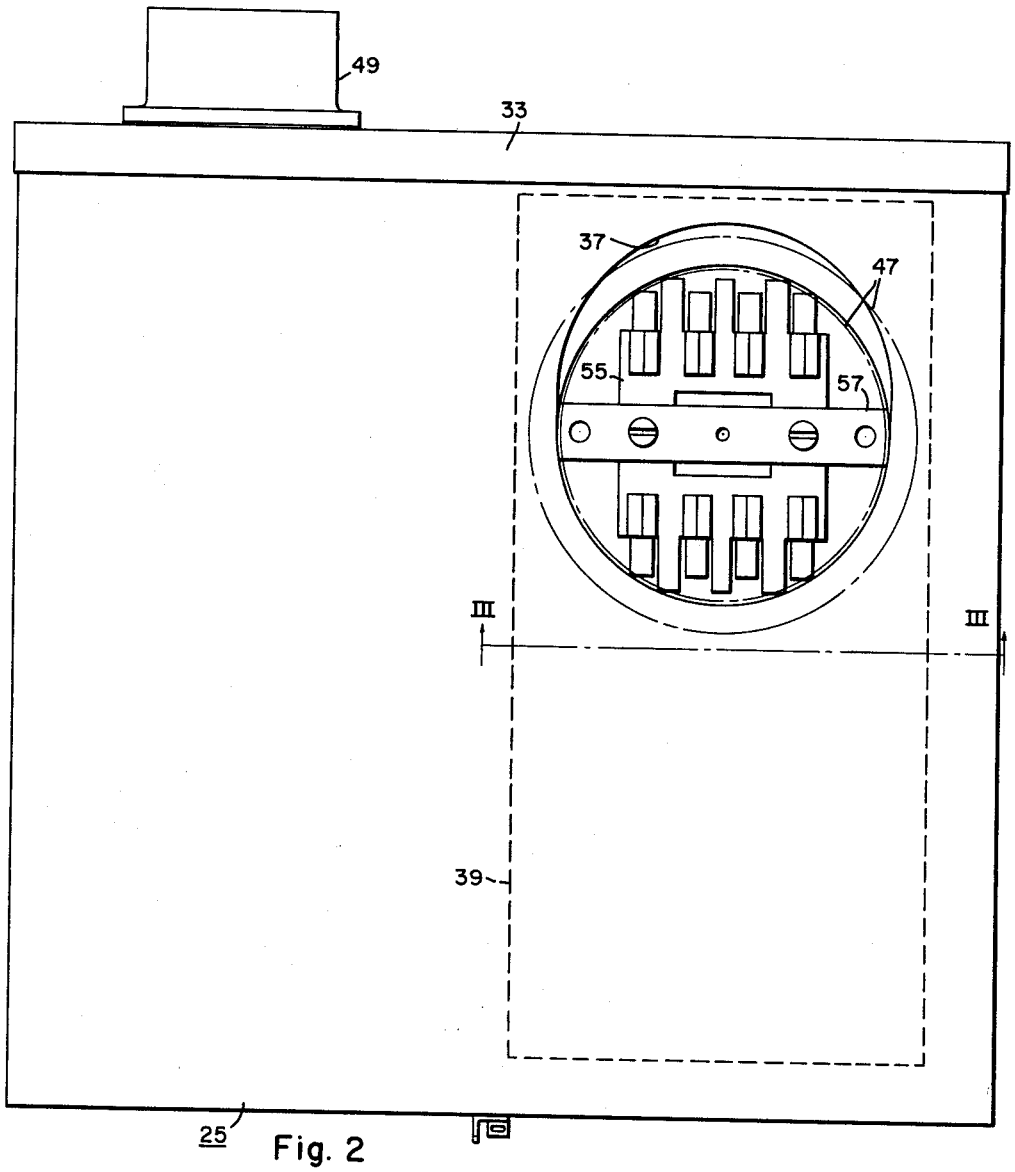

United States Patent Office 3,183,408
Patented May 11, 1965

3,183,408
INSTRUMENT MOUNTING ASSEMBLY
William A. Keller, Atlanta, Ga., and Thomas G. Willis, Raleigh, N.C., assignors to Westinghouse Electric Corporation, East Pittsburgh, Pa., a corporation of Pennsylvania
Filed Apr. 12, 1960, Ser. No. 21,668
8 Claims. (Cl. 317—104)

This invention relates to instrument mounting assemblies and it has particular relation to mounting assemblies designed for meters which are to be energized through transformers.

Aspects of the invention are applicable to instruments of various types. For example, the instruments may take the form of relays, indicating instruments, integrating meters and recording instruments. However, the invention is particularly suitable for meters for integrating functions of voltage and current, such as volt-amperehours, reactive-volt-ampere hours and watt-hours, and will be discussed with specific reference to the watt-hour meters.

The invention may be employed with meters of the bottom connected or "A" type. However, in a preferred embodiment of the invention meters of the socket or detachable type also known as "S" type meters are employed. Meters of these types are disclosed in "The Electrical Meterman's Handbook" published in 1950 by the Edison Electric Institute of New York City, Sixth Edition.

In many installations meters are required to handle large currents. If these large currents are applied directly to the meters, formidable problems of heat dissipation are presented necessitating massive parts and reliable clamping means for conductor junctions. In some cases, the meters have been energized through transformers. Examples of such energization will be found in the Wey Patent 2,642,483 and in the Johansson Patent 2,297,185. A further problem encountered in metering is due to the many configurations of circuits which must be measured or metered. The more common configurations encountered include single-phase, network, three-phase threewire, three-phase four-wire Y and three-phase four-wire delta configurations. Such configurations are described in the aforesaid handbook. In the prior art, it has been the practice to make and stock a separate metering unit for each of these configurations.

In accordance with the invention a meter and a transformer array are arranged in side-by-side relationship. This materially reduces the overall projection of the resultant structure and thus overcomes one of the major prior-art objections to mountings containing transformers.

The meter and transformer array preferably are enclosed a weather-proof enclosure. This enclosure includes a base unit and a cover which is movable to interlock with the base unit. The covering has an opening through which a portion of the meter casing projects. A gasket engages an intermediate part of the meter casing in order to provide a seal between the casing and the cover of the enclosure. The meter may be locked to the base unit independently of the cover.

Preferably, the transformers are through-type transformers having selected numbers of rigid primary windings. These primary windings are rigid bus-bars having terminals fastened to their ends or having terminals fastened to them by means of rigid bus-bars. A bus-bar kit is supplied with the mounting and may be connected to provide metering for any of the above-mentioned configurations. Preferably, a dual-voltage meter is supplied with the mounting. If the mounting is installed to meter one configuration it may be modified readily at a later date to meter another configuration.

It is therefore an object of the invention to provide an improved mounting for electrical instruments.

It is also an object of the invention to provide an improved weather-proof enclosure wherein part of an instrument casing is within the enclosure.

It is a further object for the invention to provide a transformer mounting for instruments wherein a transformer has a selected number of rigid primary windings.

It is a still further object of the invention to provide a transformer mounting for detachable instruments wherein a transformer array and a socket are mounted in side-by-side relationship.

It is an additional object of the invention to provide a transformer mounting for instruments wherein rigid connecting members may be combined in different configurations for association with different electrical systems.

It is another object of the invention to provide a method for converting a transformer-energized meter arranged to measure an electrical quantity in an electrical circuit of a first configuration to an arrangement suitable for measuring a quantity in an electrical circuit of a second configuration.

Other objects of the invention will be apparent from the following description taken in conjunction with the accompanying drawings in which:

FIG. 2 is a view in front plan of the mounting shown in FIG. 1;

FIG. 3 is a view in section taken on the line III—III of FIG. 2;

Figure 1:
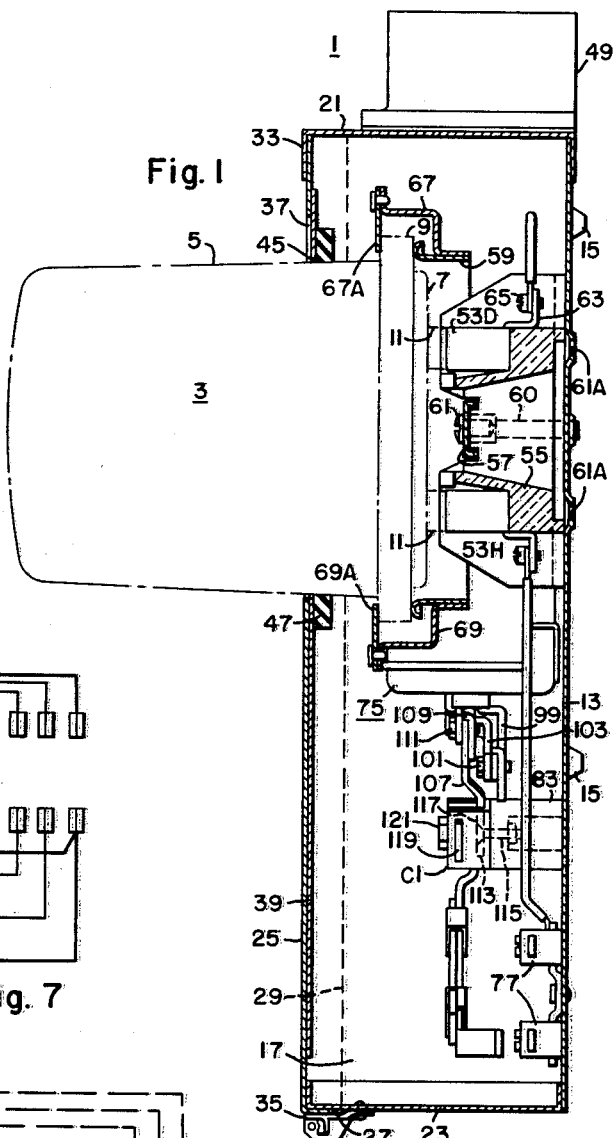
FIGURE 1 is a view in sectional elevation of a mounting embodying the invention.

Referring to the drawing, FIG. 1 shows a mounting 1 for receiving a meter 3 shown in broken lines. As previously pointed out, the meter 3 may be a bottom connected or "A" type meter. Preferably, a socket or detachable meter is employed and such a meter is shown in FIG. 1. The meter may be a conventional two-element meter, one example of which is shown in the Lenehan Patent 2,909,728. As representative of suitable specifications, the meter 3 may be a 2½ ampere dual-voltage, two-element meter. The voltage windings of each element may be connected for energization by either 120 or 240 volts in a typical installation.

The meter 3 is enclosed within a casing which includes a transparent cup-shaped cover 5 having its open end closed by a base 7. It will be noted that a flange 9 is provided adjacent the open end of the cover 5. Contact blades 11 project from the base 7 for the purpose of establishing connections between external circuits and the windings of the meter.

The enclosure 1 includes a rear wall 13 which may be secured to the vertical wall of a building or structure in any suitable manner as by machine screws (not shown). Spacing projections 15 may be provided on the rear wall for the purpose of spacing the wall slightly from the structure to which it is secured. The enclosure also includes side walls 17 and 19 together with end walls 21 and 23. Thus, the walls 13, 17, 19, 21 and 23 constitute a box which is open at its front. The front opening is closed by a removable cover 25 having a lower flange 27 which engages the outer surface of the end wall 23 and side flanges 29 and 31 which engage the outer surfaces of the side walls 17 and 19, respectively.

By inspection of FIG. 1, it will be noted that the end wall 21 has a flange 33 which engages the outer surface of the cover 25. The cover is held in mounted position by means of a locking arm 35 which is pivoted on the end wall 23. This locking arm may be pivoted from a position below the flange 27 to a position clear of the flange. The arm 35 and the flange 27 may include hasps for receiving conventional sealing wires or other sealing means.

The cover 25 has an opening 37 for permitting passage therethrough of the casing of the meter 3. With the cover in the position illustrated, the opening 37 is proportioned to engage snugly the lower half of the cover 5 of the meter. A vertical dimension of the opening 37 is larger than the diameter of the cover 5 by an amount slightly greater than the vertical dimension of the flange 33. When the cover 25 is dropped to clear the flange 33, the opening 37 is dimensioned to permit the cover 25 to engage snugly the upper half of the cover 5. Thus, a projection of the opening on a horizontal plane is slightly longer than the diameter of the cover 5.

In order to assist in weather proofing the enclosure, a plate 39 is located in engagement with the inner surface of the cover 25. This plate is guided for vertical movement by means of tongues 41 and 43 which are secured to the cover 25 and which form with the cover grooves within which the plate 39 is located. As shown in FIG. 3, the tongues 41 and 43 permit a small horizontal movement of the plate 39 relative to the cover to accommodate slight variations in dimensions of the associated parts.

By reference to FIG. 1, it will be noted that the plate 39 has an opening 45 which is proportioned to permit passage of the cover 5 snugly therethrough. Thus, the opening 45 is a circular opening having a diameter slightly greater than the corresponding diameter of the meter cover 5.

In order to complete the weather proofing of the enclosure, a gasket 47 in the form of a ring surrounds the meter cover 5. This gasket preferably is constructed of a resilient material, such as an elastomer. Although soft rubber may be employed for the gasket, preferably the gasket is constructed of foam neoprene. This is a well-known synthetic rubber made by polymerization of 2-chloro-1,3-butadiene. Synthetic rubbers, such as neoprene, have high resistance to cold, chemicals, sunlight, ozone and heat and consequently are desirable for the gasket 47. When relaxed, the gasket 47 has an inner circumference which is slightly smaller than the outer diameter of the cover 5. Consequently, when it is placed in position the gasket 47 stretches slightly to effect a satisfactory seal with the meter cover 5. The gasket 47 may be cemented to the plate 39 or it may remain in engagement with the plate solely by friction.

In order to remove the cover 25 from the remainder of the enclosure, the locking arm 35 first is pivoted clear of the flange 27. The cover 25 now may be dropped to clear the flange 33. As it drops, the cover 25 slides relative to the plate 39. Next, the cover 25 and the plate 39 are moved as a unit to the left as viewed in FIG. 1 clear of the meter 3. A reversal of these steps may be employed for restoring the cover to the position illustrated in FIG. 1.

Figure 4:
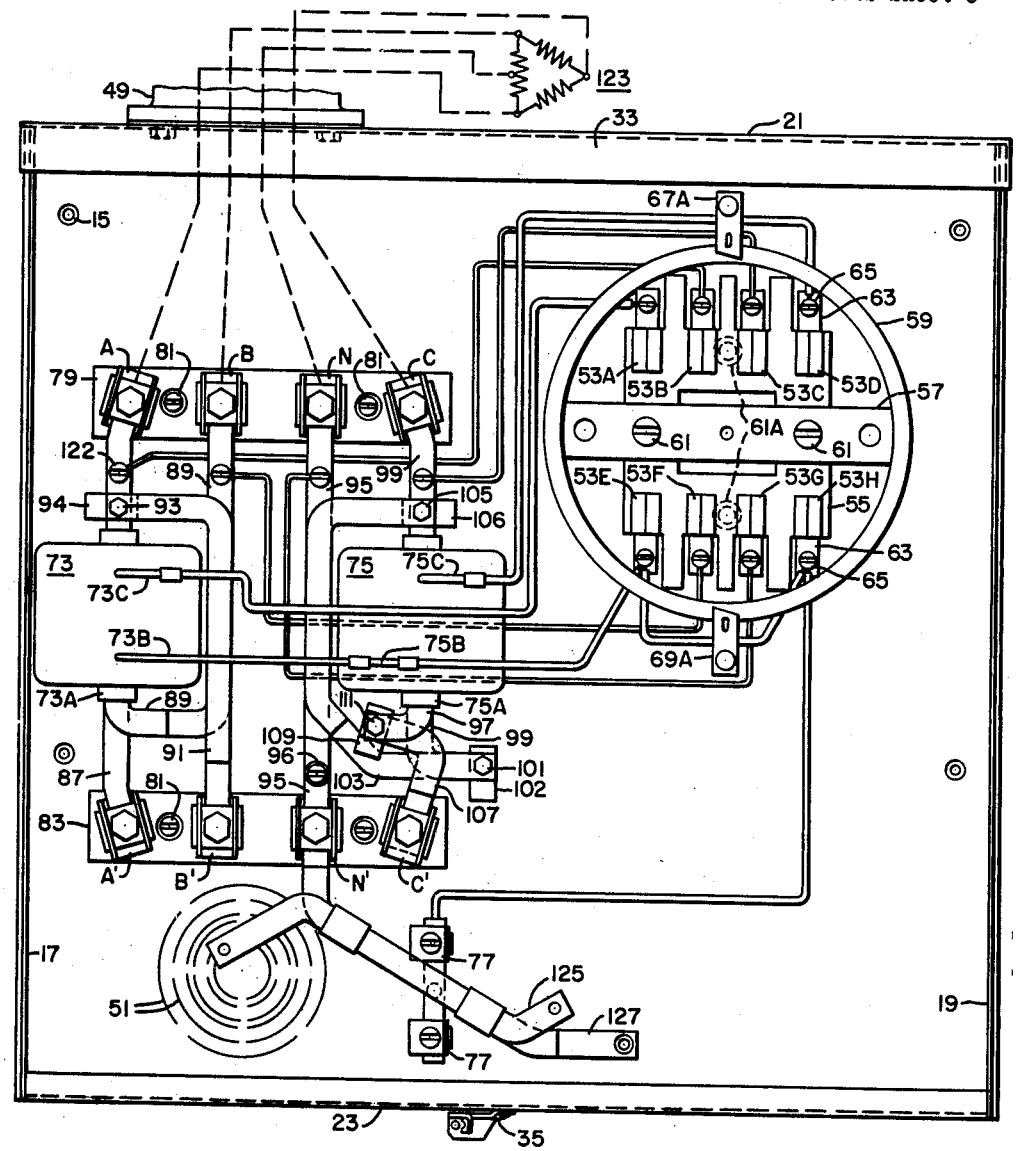
FIG. 4 is a view in front elevation of the mounting shown in FIGS. 1 and 2 but with the cover removed.

Provision is made for passing electrical conductors into and out of the enclosure 1. To this end, a hub 49 is secured to the end wall 21 and may be threaded for reception of standard conduit. Thus, electrical conductors may be introduced through the hub 49 and through an opening in the end wall 21 aligned with the hub 49. Knockouts may be provided in the walls of enclosure at other suitable positions. For example, as shown in FIG. 4, score lines 51 may be provided to permit knockout of a portion of the rear wall of the enclosure.

As previously pointed out, the meter 3 has contact blades for establishing connections between the meter windings and external circuits. It will be assumed that eight contact blades 11 are provided for this purpose. Consequently, the mounting 1 is provided with eight contact jaws 53A to 53H for receiving these contact blades. It will be assumed that through the contact blades the current windings of the first meter element are connected across the jaws 53A and 53E; the voltage windings of the first element are connected across the contact jaws 53B and 53F; the voltage windings of the second meter element are connected across the jaws 53C and 53G; and finally the current windings of the second element are connected across the jaws 53D and 53H.

In a conventional manner, the contact jaws are secured to a block 55 of insulating material which, for example, may be constructed of porcelain. The block 55 also receives the bridging bar 57 of a ring 59 which is positioned to engage the base of the meter 3. Conveniently, machine screws or studs 60 may be passed through the porcelain block 55 into threaded engagement with the rear wall 13 of the enclosure to secure the block to the enclosure. Machine screws 61 pass through the bridging bar 57 into threaded openings provided in the heads of the machine screws or studs 60 to secure the bridging bar to such studs. In a conventional manner, each of the contact jaws may have an electroconductor bracket 63 secured thereto and a terminal screw 65 in threaded engagement with the bracket for receiving a suitable conductor.

Provision may be made for locking the meter to the socket independently of the cover 25. To this end, the ring 59 has brackets 67 and 69 secured thereto. Each of the brackets has pivotally mounted thereon a locking arm, respectively 67A and 69A. The pivotal arm mounting may be effected by means of a machine screw or by a rivet. With the locking arms in the positions illustrated in FIG. 1, the meter cannot be withdrawn from its associated socket. In order to withdraw the meter, the arms 67A and 69A first must be pivoted away from the flange 9 out of the withdrawal path of the flange.

Energizations of the current windings of the meter are derived from the secondary windings of two through-type current transformers 73 and 75. These current transformers are similar in construction. The transformer 73, for example, may comprise a tube 73A of insulating material. This tube has a size sufficient to permit the passage therethrough of at least two rigid primary windings. The insulating tube 73A is surrounded by a ring of magnetic material which constitutes the magnetic core of the transformer and the ring carries a secondary winding having leads or terminals 73B and 73C. The construction of such a magnetic core and such a secondary winding for a through-type transformer is well known in the art. In a similar manner, the transformer 75 has leads or terminals 75B and 75C for its secondary winding. The leads or terminals 73B and 75B both are connected to the contact jaws 53E and 53H and to ground terminals 77 which are electrically connected to the rear wall of the enclosure. The leads or terminals 73C and 75C are connected respectively to the contact jaws 53A and 53D through flexible conductors. Consequently, the current windings of the first element of the meter are energized in accordance with the current output of the secondary winding 73, whereas the current windings of the second element of the meter are energized in accordance with the current output of the secondary winding of the transformer 75.

The terminals 77 may be of any suitable construction, for example they may be similar to the terminals shown in the Lenehan Patent 2,924,805.

The transformers 73 and 75 preferably are of high accuracy. They may have transformation ratio selected in accordance with the components with which they are associated. A transformation ratio of 24 to 1 has been found entirely satisfactory. With such transformers the induced voltage across each secondary winding is so low that the secondary circuit may be opened without harm to the transformer or to personnel who may come in contact with the circuit of the secondary winding.

For effecting suitable connections to the meter a set of load terminals and a set of line terminals are provided in the enclosure. Four line terminals A, B, N and C are mounted on an insulating block 79 which in turn is secured to the rear wall of the enclosure by means of machine screws 81. In an analogous manner, four load terminals A', B', N' and C' are mounted on an insulating block 83 which is secured to the rear wall of the enclosure by means of machine screws 81.

As previously pointed out, each of the transformers is provided with at least two primary windings. In the specific embodiment of FIG. 4, a first primary winding is provided by a rigid bus-bar 87 which extends between the terminals A and A' through the tube 73A. A second primary winding for the same transformer is provided by a rigid bus-bar 89 having a U-shape with one leg of the U passing through the tube 73A. The free end of the other leg is connected to the terminal B. The leg of the bus-bar 89 which passes through the tube 73A has its free end connected to the terminal B' through a rigid bus-bar 91 of L-shape. One end of the bus-bar 91 is connected to the terminal B' whereas the remaining end is detachably connected to the bus-bar 81 by means of a bolt 93 and a nut 94.

A rigid bus-bar 95 connects the terminals N and N'. This bus-bar carries a terminal 96 which may be mounted in a square opening 96 (FIG. 5) provided in the bus-bar. The terminal 96 is useful for receiving a conductor (not shown) which is to be connected to the terminal 97 for grounding the bus-bar 95.

Two primary windings for the transformer 75 are provided by two rigid L-shaped bus-bars 97 and 99 each having a leg passing through the insulating tube 75A of the transformer 75. As shown in FIG. 4, the upper end of the bus-bar 99 is secured to the terminal C. The remaining end of this bus-bar is detachably bolted by means of a bolt 101 and a nut 102 to the lower end of a U-shaped rigid bus-bar 103 having its upper end detachably bolted to the upper end of the bus-bar 97 by means of a bolt 105 and nut 106. The lower end of the bus-bar 97 is detachably bolted to the upper end of an L-shaped rigid bus-bar 107 which has its lower end connected to the terminal C'. With this configuration, the bus-bars 97 and 99 are connected in series to provide a two turn rigid winding for the transformer 75.

Figure 5:
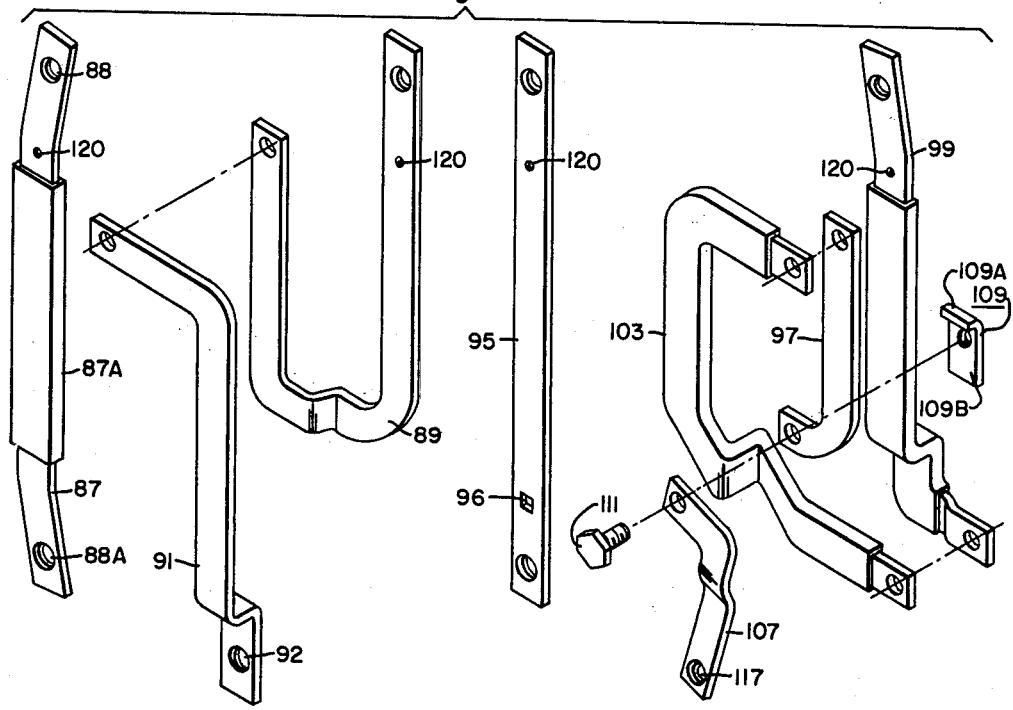
FIG. 5 is an exploded view in perspective showing a bus-bar configuration employed in the mounting of FIG. 4.
Figure 8:
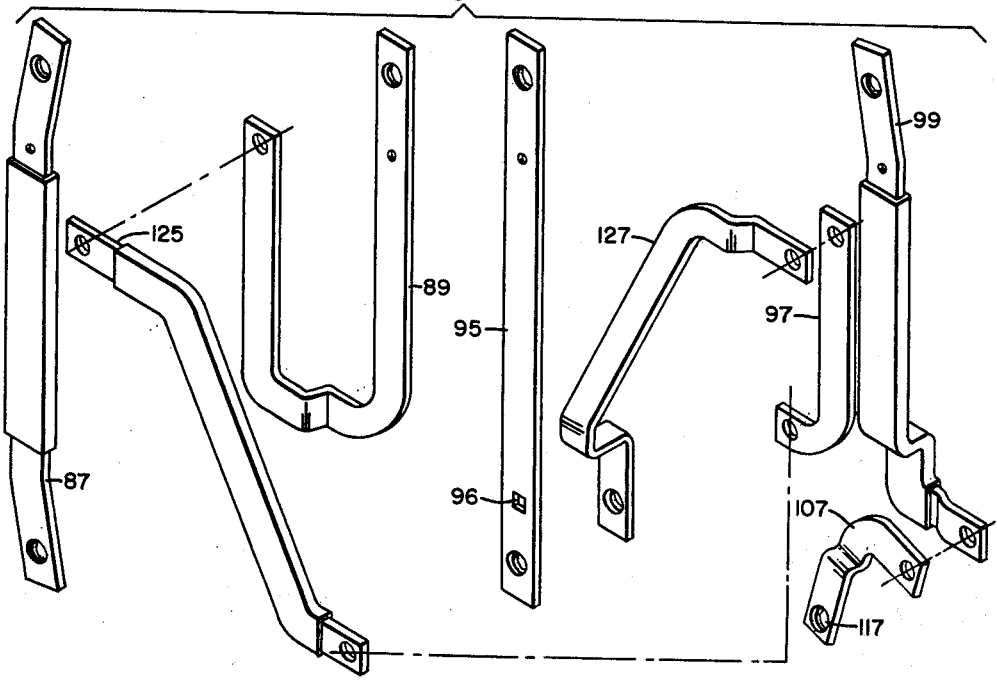
FIG. 8 is an exploded view in perspective showing the bus-bar configuration of FIG. 7.

The shapes of the bus-bars are shown more clearly in FIG. 5. It will be noted that the bus-bar 87 is disposed in the plane of the terminals to which its ends are connected. To facilitate such connections to the terminals each end of the bus-bar is provided with a countersunk opening 88 and 88A. The bus-bar 89 has one leg, the right hand leg in FIG. 5, disposed in this same plane. However, the remaining leg of the bus-bare 89 is bent or displaced forwardly in order to permit it to lie in front of the bus-bar 87 when in assembled position. The lower end of the bus-bar 91 is bent rearwardly in order to bring this end again into the plane of the terminal to which it is connected through a countersunk opening 92.

The bus-bar 95 is disposed in the plane of the terminals to which it is connected.

The bus-bar 99 has its upper end in the plane of the terminal to which it is connected but the lower end is displaced rearwardly to position it behind certain other bus-bars. The bus-bar 103 has its lower end bolted to the lower end of the bus-bar 99 and the upper end of the bus-bar 103 is displaced forwardly to bring it into proper position to engage the upper end of the bus-bar 97 to which it is bolted. Finally, the lower end of the bus-bar 107 is bent rearwardly to bring it into the plane of the terminal to which it is attached through a countersunk opening 117.

Although any suitable bolting or securing means may be employed for the bus-bars, a preferred nut is shown in FIG. 5. This nut has a lip 109A which extends snugly alongside the bus-bar against which the nut is located. Consequently, the lip 109A prevents rotation of a nut while the bolt 111 associated therewith is inserted or removed. In addition, the nut 109 has a projecting tab portion 109B which extends beyond the bus-bar to which the nut is secured and provides a holding portion which may be held between the fingers of the operator or by a tool while the nut is being secured in position or removed.

Any suitable construction may be employed for the line and load terminals. As shown more clearly in FIG. 1, the terminal C' may comprise a U-shaped steel trough having its base secured to the insulating block 83 in any suitable manner as by a bolt 115 having a countersunk head. The bolt may extend not only through the base of the trough 113 but through the countersunk opening 117 provided in the associated bus-bar 107. Each leg of the trough 113 is provided with a slot for removably receiving a bridging plate 119 having a central threaded opening for removably receiving a machine screw 121.

If a load conductor is to be secured to the terminal C' the screw 121 first is removed from the bridging plate 119 and the bridging plate 119 then is withdrawn from its slot. The load conductor then may be laid in the trough 113 and the bridging plate may be restored to the position illustrated. The screw 121 now may be reintroduced to clamp the load conductor firmly in the trough 113.

Each of the bus-bars 87, 89, 95 and 99 is provided with a threaded opening 120 for receiving a terminal screw 122. These terminal screws are employed for securing to the bus-bars flexible conductors which extend to the contact jaws associated with the voltage windings of the meter. In the specific embodiment of FIG. 4, the bus-bars 87, 89, 95 and 99 are connected respectively by their terminal screws 121 through flexible conductors to the contact jaws 53B, 53F, 53G and 53C. Consequently, the voltage windings of the first element are connected across the bus-bars 87 and 89 or across the terminals A and B. The voltage windings for the second element are connected across the bus-bars 99 and 95 or across the terminals C and N.

The configuration of FIG. 4 is suitable for three-phase four-wire delta service. It will be noted that the four terminals A, B, N and C are connected by dotted line conductors extending through the hub 49 to a winding 123 which is arranged for four-wire service. The winding 123 may represent the delta-connected secondary winding of a three-phase transformer designed for operation at a frequency of 60 cycles per second. This winding may have a phase-to-phase voltage of the order of 240 volts. It will be understood that load conductors may be connected to the terminals A', B', N' and C' in a conventional manner for receiving power from the winding 123.

For some configurations two additional bus-bars are provided. These bus-bars 125 and 127 are shown in FIG. 4 secured to the terminal N'. Inasmuch as they are not required for the service represented by FIG. 4, the customer ordinarily would remove these two bus-bars and keep them for possible further use.

Rigid copper of rectangular cross section may be employed for the various bus-bars. Parts of the bus-bars which may be located adjacent to parts of other bus-bars may be provided with insulating protection. For example, in FIG. 5, the bus-bar 87 is provided with insulation 87A. This may be in the form of an insulating sleeve slipped over the bus-bar but satisfactory results have been obtained from an insulating coating applied directly to the bus-bar. In an analogous manner, insulation is supplied to the bus-bars 99, 103 and 125.

Figure 6:
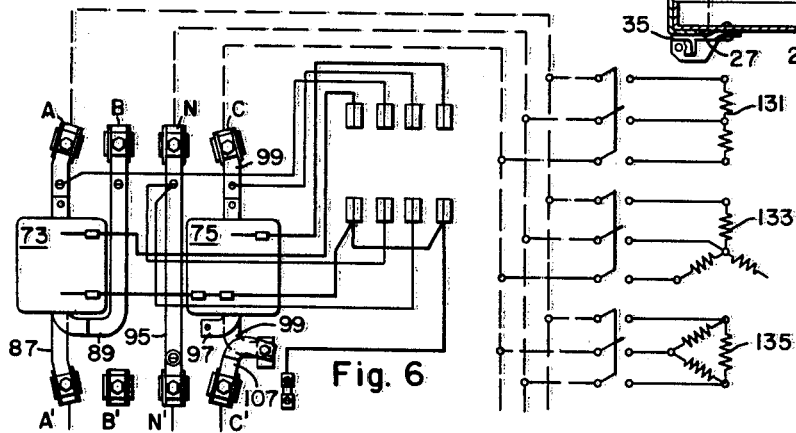
FIG. 6 is a schematic view with parts shown in elevation showing a modified configuration of bus-bars which may be employed in the mounting of FIGS. 1 to 4.

Let is be assumed next that the equipment shown in FIG. 4 is to be re-connected for single-phase three-wire operation, three-phase three-wire operation or network operation. The resultant configuration is illustrated in FIG. 6. For this configuration, the bus-bars 91 and 103 of FIG. 4 are removed and are not employed. In addition, the bus-bar 107 is disconnected and reversed to connect the lower end of the bus-bar 99 to the terminal C'. With these connections, only the bus-bar 87 is effective as a primary winding for the transformer 73. Only the bus-bar 99 is effective as a primary winding for the transformer 75 and this bus-bar now is connected through the bus-bar 107 across the terminals C and C'. It will be noted that the terminals B and B' are not employed in this configuration. The voltage windings for the first element of the meter are now connected across the terminals A and N, whereas the voltage windings for the second element are connected across the terminals C and N.

Line connections may be run from the three terminals A, N and C as illustrated in FIG. 6 by broken lines to any one of three windings 131, 133 or 135. The winding 131 represents the secondary winding of a single-phase transformer operating at a frequency of 60 cycles per second and designed to provide three wire service In a typical installation, the voltage between the outer terminals of the winding 131 may be of the order of 240 volts The meter elements should be connected for 120 volt energization for the windings 131 and 133.

The winding 133 may represent the secondary winding of a three-phase transformer designed for operation at a frequency of 60 cycles per second. Only two windings of the Y-connected secondary 133 are employed to provide what is termed "network operation." The phase-to-phase voltage of this winding may be of the order of 240 volts.

The winding 135 may represent the delta-connected secondary winding of a three-phase transformer designed for operation at a frequency of 60 cycles per second. If the phase-to-phase voltage of the winding 135 is of the order of 240 volts the voltage windings of the two meter elements should be connected for 240 volt energization. It will be understood that the three terminals A', N' and C' are to be connected to a suitable load in a manner well understood in the art.

Figure 7:
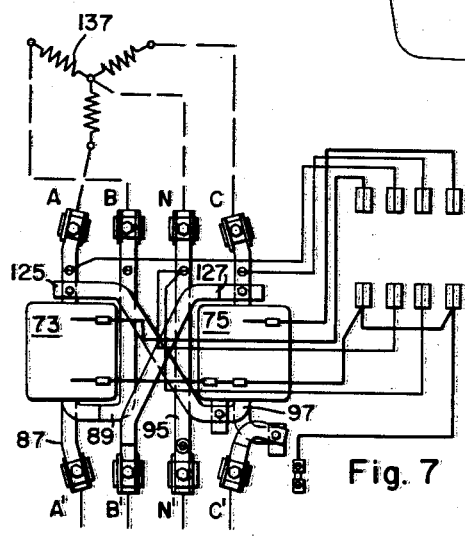
FIG. 7 is a further modification in schematic form with parts shown in elevation showing another configuration of bus-bars which may be employed in the mounting of FIGS. 1 to 4.

Let it be assumed next that a configuration of FIG. 6 is to be modified in order to permit metering of three-phase four-wire Y service. By comparison of FIGS. 6 and 7, it will be noted that the only changes in FIG. 7 consist of the addition of the bus-bar 125 which now connects the left end of the bus-bar 89 to the lower end of the bus bar 97 and the addition of the bus-bar 127 which now connects the upper end of the bus-bar 97 to the load terminal B'. This connects one primary winding for each of the transformers 73 and 75 in series for energization in accordance with current flowing through the terminal B to the terminal B'. The transformer 73 now receives a primary energization dependent on the vector sum of the currents flowing through the terminals A and B, whereas the transformer 75 now receives a primary energization dependent on the vector sum of the currents flowing through the terminals C and B. This means that the configuration of FIG. 7 is suitable for metering three-phase four-wire Y service which is represented by the winding 137 having its phase terminals connected to the line terminals A, B and C and its neutral terminal connected to the terminal N. The winding 137 may represent the secondary winding of a three-phase transformer designed to operate at a frequency of 60 cycles and having a secondary phase-to-phase voltage of the order of 208 or 480 volts. The load may be connected to the load terminals A', B', C' and N' in a conventional manner. The meter elements should be connected for 120 volt energization for the 208 volt phase-to-phase three-phase transformer and for 240 volt energization for the 480 volt phase-to-phase three-phase transformer.

For some applications the enclosure would be arranged for horizontal mounting. In such mounting the enclosure would be rotated 90 degrees about an axis perpendicular to the plane of FIG. 4. To permit proper orientation of the meter under such conditions the rear wall 13 is provided with two additional threaded openings 61A for receiving the machine screws or studs 60 when the block 55 and the ring 59 are rotated 90 degrees about the axis of the ring from their positions illustrated in the drawings. Such rotation of the block and rings orients the meter properly for horizontal mounting of the enclosure. The various leads and connections are long enough to permit such rotation.

If desired, the block 55 may be made deep enough, or may be spaced from the rear wall 13 sufficiently to position the flange 9 against the gasket 47. Under such circumstances the locking arms 67A and 69A could be omitted. Such a construction is shown in FIG. 9.

Figure 9:
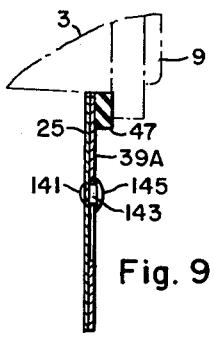
FIG. 9 is a view in sectional elevation with parts broken away showing a modified embodiment of the invention.

FIG. 9 also shows a modified construction for securing the cover 25 and the plate to each other by a lost-motion coupling to replace the tongues 41 and 43 of FIG. 3. The cover 25 has secured to its two or more spaced rivets one of which 141 is shown in FIG. 9. Each of the rivets has a shoulder 143 which engages the inner face of the cover 25 and a head 145 which has a diameter larger than that of the shoulder. For each rivet the plate 39A, which corresponds to the plate 39 of FIG. 1, has a slot proportioned to receive snugly and slidably the shoulder 143. The slot is too narrow to permit passage of the head 145 therethrough, but extends in the direction of desired relative movement between the cover 25 and the plate 39A for a distance sufficient to permit such desired relative movement.

Although the invention has been described with reference to certain specific embodiments thereof, numerous modifications falling within the spirit and scope of the invention are possible.

We claim as our invention:

1. In a mounting for an electrical device, an enclosure member, a socket unit having contact jaws for detachably receiving contact blades of a detachable electric device having contact blades, a plurality of terminals disposed in side-by-side relationship with the socket unit in the enclosure, a through-type transformer having a plurality of rigid primary windings removably located in a magnetic core having a secondary winding associated therewith and located on one side of the socket unit, rigid connectors for detachably connecting said rigid primary windings respectively across separate pairs of said terminals, and means connecting the secondary winding to certain of said contact jaws, whereby the energizaion of said secondary winding may be modified by modifying the connections of said rigid primary windings relative to said terminals.

2. In a mounting for an electrical device, an enclosure member, a socket unit having contact jaws for detachably receiving contact blades of a detachable electric device having contact blades, a plurality of terminals disposed in side-by-side relationship with the socket unit in the enclosure, a through-type transformer having a plurality of rigid primary windings removably located in a magnetic core having a secondary winding associated therewith and located on one side of the socket unit, each of said primary windings having a hole therethrough at each end, rigid connectors having parts extending into said holes for detachably connecting said rigid primary windings respectively across separate pairs of said terminals, means connecting the secondary winding to certain of said contact jaws, whereby the energization of said secondary winding may be modified by modifying the connections of said rigid primary windings relative to said terminals, and electrical connection means detachably connected to certain of said rigid connectors and extending between certain of said rigid connectors and certain of said contact jaws.

3. In a mounting for an electrical device, an enclosure member, a socket unit having contact jaws for detachably receiving contact blades of a detachable electric device having contact blades, a plurality of terminals disposed in side-by-side relationship with the socket unit in the enclosure, a through-type transformer located at one side of the socket unit and having a first rigid primary winding rigidly connected across a first pair of said terminals for energization therefrom, said transformer having a second rigid primary winding having a hole therethrough at each end, rigid screw-connected connector means having parts in said openings and having rigid configurations for detachably connecting the second rigid primary winding rigidly across a second pair of said terminals for energization therethrough, said transformer having a secondary winding, and means connecting the secondary winding across certain of said contact jaws, whereby the energization of said secondary winding may be modified by modifying the connections of said rigid primary windings relative to said terminals.

4. In an electrical device, a first terminal unit, a second set of terminal units, a through transformer unit comprising a magnetic core having a secondary winding associated therewith, said through transformer unit having an opening for reception of a plurality of rigid primary winding conductors, and a plurality of connector rigid conductors for connecting the primary winding conductors between said terminals, said conductors being shaped to provide a first configuration of a plurality of said conductors for establishing a rigid connection between said terminals which provides a single primary turn for the transformer unit and a second configuration of a plurality of said conductors for establishing a rigid connection between said terminals which provides plural primary turns for said transformer unit, certain of said connectors being common to said two configurations.

5. A transformer assembly for supplying energization to an electrical device, said assembly comprising first, second and third pairs of terminals, first and second through-type transformers, a first rigid bus-bar extending between said first pair of terminals through the first through-type transformer to constitute a first primary winding for the first through-type transformer, a second rigid bus-bar extending through the second through-type transformer to constitute a primary winding for the second through-type transformer, a third rigid bus-bar connected in series with the second rigid bus-bar across the second pair of terminals, a fourth rigid bus-bar extending from one of the third pair of terminals through the first through-type transformer to constitute a second primary winding for such transformer insulated from the first primary winding, and additional rigid bus-bar means detachably connecting the fourth rigid bus-bar across one of said pair of said terminals for energizing the second primary winding of the first through-type transformer.

6. A transformer assembly for supplying energization to an electrical device, said assembly comprising first, second and third pairs of terminals, first and second through-type transformers, a first rigid bus-bar extending between said first pair of terminals through the first through-type transformer to contsitute a first primary winding for the first through-type transformer, a second rigid bus-bar extending through the second through-type transformer to constitute a primary winding for the second through-type transformer, a third rigid bus-bar connected in series with the second rigid bus-bar across the second pair of terminals, a fourth rigid bus-bar extending from one of the third pair of terminals through the first through-type transformer to constitute a second primary winding for such transformer insulated from the first primary winding, a fifth rigid bus-bar extending through the second through-type transformer to constitute a second primary winding insulated from the first-named primary winding for such transformer, and rigid bus-bar means detachably connecting the fourth and fifth rigid bus-bars in series across one of said pairs of terminals, whereby the connections of said primary windings may be readily modified to alter the energizations of said transformers.

7. A transformer assembly for supplying energization to an electrical device, said assembly comprising first, second and third pairs of terminals, first and second through-type transformers, a first rigid bus-bar extending between said first pair of terminals through the first through-type transformer to constitute a first primary winding for the first through-type transformer, a second rigid bus-bar extending through the second through-type transformer to constitute a primary winding for the second through-type transformer, a third rigid bus-bar extending from one of the third pair of terminals through the first through-type transformer to constitute a second primary winding for such transformer insulated from the first primary winding, a fourth rigid bus-bar extending through the second through-type transformer to constitute a second primary winding insulated from the first-named primary winding for such transformer, rigid bus-bar means detachably connecting the third rigid bus-bar across the third pair of terminals for energization, and rigid bus-bar means detachably connecting the fourth rigid bus-bar in series with second rigid bus-bar across said second pair of terminals, whereby the connections of said primary windings may be readily modified to alter the energizations of said transformers.

8. A transformer assembly for supplying energization to an electrical device, said assembly comprising first, second and third pairs of terminals, first and second through-type transformers, a first rigid bus-bar extending between said first pair of terminals through the first through-type transformer to constitute a first primary winding for the first through-type transformer, a second rigid bus-bar extending through the second through-type transformer to constitute a primary winding for the second through-type transformer, a third rigid bus-bar connected in series with the second rigid bus-bar across the second pair of terminals, a fourth rigid bus-bar extending from one of the third pair of terminals through the first through-type transformer to constitute a second primary winding for such transformer insulated from the first primary winding, additional rigid bus-bar means detachably connecting the fourth rigid bus-bar across one of said pair of said terminals for energizing the second primary winding of the first through-type transformer, and screw-operated terminal connectors carried by certain of said rigid bus-bars and bus-bar means, whereby the connections of said primary windings may be readily modified to alter the energizations of said transformers.

References Cited by the Examiner

UNITED STATES PATENTS

| | | | |
|---|---|---|---|
| 2,403,132 | 7/46 | Sparks | 317—107 |
| 2,631,210 | 3/53 | Jensen | 317—108 |
| 2,697,185 | 12/54 | Johansson | 317—108 |
| 2,822,417 | 2/58 | Mathison | 317—109 |
| 2,907,928 | 10/59 | Rutledge | 317—109 |
| 3,003,085 | 10/61 | Rund | 317—107 |

FOREIGN PATENTS 1,081,561  5/60  Germany.

JOHN F. BURNS, *Primary Examiner.*

SAMUEL BERNSTEIN, *Examiner.*